United States Patent
Roberts et al.

(10) Patent No.: US 7,758,772 B2
(45) Date of Patent: Jul. 20, 2010

(54) COMPOSITION COMPRISING A LIQUID CRYSTAL MATERIAL AND AN ADDITIVE

(75) Inventors: Anthony Roberts, Stuttgart (DE); Akira Masutani, Fellbach (DE); Akio Yasuda, Esslingen (DE); Bettina Schueller, Stuttgart (DE); Shunichi Hashimoto, Ayaseshi Kanagwa (JP); Eriko Matsui, Yokohamashi (JP)

(73) Assignees: Sony Deutschland GmbH, Cologne (DE); Sony Corporation, Tokyo (JP)

( * ) Notice: Subject to any disclaimer, the term of this patent is extended or adjusted under 35 U.S.C. 154(b) by 747 days.

(21) Appl. No.: 10/582,399

(22) PCT Filed: Oct. 7, 2004

(86) PCT No.: PCT/EP2004/011212

§ 371 (c)(1),
(2), (4) Date: Dec. 26, 2006

(87) PCT Pub. No.: WO2005/059061

PCT Pub. Date: Jun. 30, 2005

(65) Prior Publication Data

US 2007/0125981 A1 Jun. 7, 2007

(30) Foreign Application Priority Data

Dec. 11, 2003 (EP) .................................. 03028570

(51) Int. Cl.
C09K 19/00 (2006.01)
C09K 19/06 (2006.01)
C09K 19/52 (2006.01)

(52) U.S. Cl. .............................. 252/299.01; 252/299.2; 252/299.5; 430/20; 428/1.1

(58) Field of Classification Search ............ 252/299.01, 252/299.2, 299.5; 428/1.1; 430/20
See application file for complete search history.

(56) References Cited

U.S. PATENT DOCUMENTS

| 3,656,834 | A | | 4/1972 | Haller et al. |
| 3,848,966 | A | | 11/1974 | Smith et al. |
| 3,979,320 | A | * | 9/1976 | Ozutsumi et al. ........ 252/299.3 |
| 4,357,374 | A | | 11/1982 | Ogawa |
| 7,014,891 | B2 | * | 3/2006 | Roberts et al. ............... 428/1.1 |

FOREIGN PATENT DOCUMENTS

| EP | 0 541 388 | 5/1993 |
| EP | 0 681 020 | 11/1995 |
| EP | 1 197 791 | 4/2002 |
| EP | 1 413 620 | 4/2004 |

OTHER PUBLICATIONS

Jacq, Philippe et al., "Preliminary Communication Chiral butadiene-tricarbonyliron liquid crystal complexes: racemates and enantiomers", Liquid Crystals, vol. 21, No. 2, pp. 291-293, 1996.

Barmatov, E.B. et al., "Induction of the cholesteric mesophase in hydrogen-bonded blends of polymers with a low molecular mass chiral dopant", Liquid Crystals, vol. 26, No. 4, pp. 581-587, 1999.

Barmatov, E.B. et al., "Cholesteric mesophase of the hydrogen-bonded blends of liquid crystalline ionogenic copolymers with a low molecular weight chiral dopant", Journal of Polymer Science, Part A (Polymer Chemistry), vol. 37, No. 16, pp. 3215-3225, 1999. (English abstract only).

Takeda, M. et al., "Synthesis and properties of trifluoromethylated chiral dopants for ferroelectric liquid crystals", Journal of Materials Science, vol. 30, No. 20, pp. 5199-5209. 1995. (English abstract only).

* cited by examiner

*Primary Examiner*—Geraldina Visconti
(74) *Attorney, Agent, or Firm*—Oblon, Spivak, McClelland, Maier & Neustadt, L.L.P.

(57) ABSTRACT

The invention refers to a composition comprising a liquid crystal material and an additive, preferably a dopant capable of forming a complex with said LC material, to a liquid crystal cell comprising this composition, uses thereof and to a method of improving the response time of a liquid crystal.

20 Claims, 12 Drawing Sheets

J6 [aka MJ6B] (permanent dipole)

L20 (induced dipole

| Mode | AP | TN | | | VAN | |
|---|---|---|---|---|---|---|
| LC & Dopant | $+\Delta\varepsilon$ & 1(A) | $+\Delta\varepsilon$ & 1(A) | $+\Delta\varepsilon$ & 4(B) | $+\Delta\varepsilon$ & 3(A) | $-\Delta\varepsilon$ & 2(A) | $-\Delta\varepsilon$ & 4(B) |
| $\Delta\varepsilon$ | +15% | +15% | -5% | +12% | +12% | +6% |
| Rise time | +22% | +13% | +10% | +28% | +25% | +33% |
| Decay time | 0% | +25% | +12% | +8% | +12% | 0% |

1(A) = MORPIP, 15D

2(A) = J6, 6D

3(A) = 10-γP3CNQ, 8D

4(B) = L20, 0.03D

COMPOSITION COMPRISING A LIQUID CRYSTAL MATERIAL AND AN ADDITIVE

The invention refers to a composition comprising a liquid crystal material and an additive, preferably a dopant, to a liquid crystal cell comprising this composition, uses thereof and to a method of improving the response time of a liquid crystal.

Liquid crystals and liquid crystal mixtures (LCs) can be used for a wide area of applications. One of the most popular applications for liquid crystal is the liquid crystal display (LCD) especially for notebook computers but increasingly also for monitors of desktop computers or televisual applications One of the most important advantages of the liquid crystal displays is, in comparison to other monitors, the range of sizes of the displays, from the very small to the very large. Furthermore, the flicker free picture they produce is very convenient for the user and is especially protective for the eyes of the users, especially in case of long term working before the display.

However, the majority of technological viable applications of LCs in displays suffer from a common problem, the slow speed of response of the material to the application (increase) or removal (decrease) of an external field. It is this limitation that this patent addresses.

A liquid crystal display comprises an array of liquid crystal cells. Different liquid crystal cells have been developed in the recent years; the most important liquid display cells are the TN cell (twisted nematic cell), the STN cell (super twisted nematic cell), IPS cell (in plane switching cell), OCB cell (optically controlled birefringence), and PDLC cells (polymer dispersed liquid crystal cells) etc. Liquid crystal cells normally use nematic liquid crystals, however, other phases such as smectic liquid crystals, ferroelectric liquid crystals or cholesteric liquid crystals also may be utilized.

All the above-mentioned liquid crystal materials generally have common characteristics. They provide a rod-like molecular structure—a rigidness of the long axis, a flexible portion to assist steric ordering and/or alignment; and dipoles and/or easily polarisable substituents, therefore providing permanent or induced dipoles.

The distinguishing characteristic of the liquid crystalline state is the tendency of the molecules to point along in the same direction, so called the director. The tendency of the liquid crystal molecules to point along the director leads to a condition known as bulk anisotropy. This term means that the properties of the material, especially the light transmission properties, depend on the direction in which they are measured. This anisotropic nature of liquid crystal is responsible for the unique optical properties.

In liquid crystal cells and liquid crystal displays, the orientation of the molecules can be controlled such as by applying an electric or a magnetic field to the liquid crystal material or mixture or the liquid crystal cell. The liquid crystal molecules, having a permanent dipole or an induced dipole, tend to orient themselves with their dipole along the direction of the field. The dipole need not be collinear with the director.

By applying an electric or a magnetic field to the liquid crystal mixture or the liquid crystal cell as part of a suitable optical environment (such as an optical system comprising also polarisers external to the LC cell, or dichroic dyes internal to the cell), the molecules can be switched generally between two stages or orientations, an "on-state", where the liquid crystal cell is transparent/transmissive in a preferred direction, and an "off-state", where the liquid crystal cell system is not transparent/opaque in this preferred direction.

Depending on the liquid crystal cell, the transparency is influenced by different effects: with a TN cell (twisted nematic cell) the polarization of the light is influenced within the liquid crystal material, whereas on both sides of the liquid crystal materials polarizing filters and in some cases mirror(s) and/or retarder(s) are provided. Depending on the applied field, the polarization is influenced or not influenced within the liquid crystal material primarily by means of the twist of the liquid crystal, therefore light can transmit both polarizing filters in the above mentioned "on-state" or cannot transmit through the polarizing filters in the "off-state".

With an OCB cell (optically compensated birefringent cell) the polarization of the light is influenced within the liquid crystal material, whereas on both sides of the liquid crystal materials polarizing filter(s), waveplate(s) and in some cases mirror(s) are provided. Depending on the applied field, the polarization is influenced or not influenced within the liquid crystal material primarily by the birefringence (or optical retardance) of the liquid crystal, therefore light can transmit both polarizing filters in the above mentioned "on-state" or cannot transmit through the polarizing filters in the "off-state".

In a PDLC cell (polymer dispersed liquid crystal cell), small liquid crystal droplets are dispersed uniformly in a transparent polymer matrix. The diameters of the liquid crystal microdroplets are comparable to the wavelength of visible light. Since these diameters are small compared with the film thickness, a light ray emitted in a first direction (being the direction the transmitting will be essential in regarding the function of the liquid crystal cell or display, therefore also referred to as the functional or the preferred direction) will be scattered many times before emerging from the film, provided that the mismatch of refractive index between liquid crystal and polymer is sufficiently large in the "off-state". The film will appear milky white in the absence of an applied field because of the above-mentioned scattering. On the other hand, in the "on-state", when the director of the individual droplets is aligned with a field, the refractive index of the liquid crystal within the droplets becomes sufficiently close to the index of the polymer matrix material and therefore the liquid crystal material becomes transparent in the above mentioned preferred direction. When the field is removed, the liquid crystal domains recover their initial orientations because of surface forces and because the cavities are not ideal spheres. The degree of "off-state" scattering will depend on the amount of refractive index mismatch, size and the number density of the liquid crystal droplets.

In order to enable display of colour information, either a colour filter is placed on the LC cell system, or dichroic dyes are incorporated in the liquid crystal materials.

In general, liquid crystals are excellent solvents for especially organic molecules. Therefore, when a small amount of a dye with geometric anisotropy is mixed in a liquid crystal, the dye molecules couple with the anisotropic intermolecular interaction field of the liquid crystal; they tend to arrange in such a way that their long molecule axes align along the liquid crystal director. When a field, preferably an electric field is applied, the orientation of the dye molecules can be switched along the liquid crystal orientation. This phenomenon is known as "guest-host interaction", the respective liquid crystal cell is therefore called guest-host effect cell.

The quality of liquid crystal cell or liquid crystal display is provided on the one hand by a good contrast and a good colour, therefore by good optical properties, on the other hand by the response time of the liquid crystal cells, when switching the cell from e.g. the off-state to the on-state or vice versa.

A rise time is usually defined as the time needed for the material or the cell to reach 90% of the on-state transmission when a field is applied. Similarly, a decay time is defined as the time needed for the material in the on-state to reach 10% of the on-state transmission, when the field is set to zero. Fast response times are very important, especially for moving pictures but also for standard computer applications with changing pictures.

Electronic device display technologies require displays with high brightness and contrast, low power consumption, and fast refresh/response speeds. For tele-visual display elements, liquid crystal (LC) technology is being explored and in particular for twisted nematic, optically controlled birefringence, in-plane switching and vertically aligned nematic modes, either positive or negative dielectric anisotropy type liquid crystals are of interest. In these materials it is important to achieve good liquid crystal alignment in both the off and on state (giving good contrast) and rapid response times.

Numerous researches have been carried out on liquid crystals [such as 1-4], however none of these has so far succeeded in improving the material properties of liquid crystals with either positive or negative dielectric anisotropies without degrading the alignment of the liquid crystal(s).

1. Asami Masanao, Konno Toshio, Shimizu Shigeo, Natsuhori Hiroyuki, Shigeta Masanobu, Shimada Tadayuki, 12 May 1993: EP 0 541 388.
2. Haller Ivan, Huggins Harold, 18 Apr. 1972: U.S. Pat. No. 3,656,834.
3. Smith G, Hayden D, 19 Nov. 1974: U.S. Pat. No. 3,848,966.
4. Ogawa Shoichi, 2 Nov. 1982: U.S. Pat. No. 4,357,374.

The present inventors have had experience in doping liquid crystals with permanently dipolar dopants in order to improve the response times (see EP 1 197 791 A2).

None of the compositions disclosed therein, however, have proved particularly good with respect to alignment of liquid crystal molecules and grey scale response speed, i.e. grey-state to grey-state response times.

Accordingly it was an object of the present invention to provide a liquid crystal system with improved properties, in particular improved response times, an improved alignment, improved dielectric anisotropy and improved grey-state to grey-state response times.

All these objects are solved by a composition comprising a liquid crystal material and an additive, preferably a dopant, wherein said additive is capable of forming a complex with said liquid crystal material.

In one embodiment, said liquid crystal material and said additive form a complex, wherein, preferably, said liquid crystal material and said additive form a complex, as measured by a method selected from the group comprising FTIR, UV-visible absorption, fluorescence, in particular polarized fluorescence, dielectric anisotropy and scanning near-field optical microscopy. With FTIR, UV-visible absorption and fluorescence, it is preferred that said complex formation is measured as a band-shift.

In one embodiment, said liquid crystal material and said additive form a complex as simulated in MOPAC-simulations, wherein, preferably, said MOPAC-simulations comprise the following steps/conditions:

in a computer environment,
  providing a molecular structure of said liquid crystal material and a molecular structure of said additive,
  optimizing each molecular structure individually by determining the lowest energy of formation, determining the AM1 and PM3 Hamiltonians and selecting the lowest energy molecular structure that is best fitted by both Hamiltonians,
  bringing together the optimized individual molecules resulting from the previous step, allowing them to combine, taking into account the charges of atoms, the distribution of charges and the dipole moment of the molecular structures,
  permutating the previous combination step a number of times, preferably in the range of from 100-1000 times, more preferably 200-800 times, even more preferably 400-600 times and most preferably about 500 times, thus allowing a complex, if any, of said liquid crystal material and additive molecules to form,
  in such complex of molecules, optimizing the structure of the individual molecules so as to determine the lowest energy of formation of the complex and the lowest energy state of the complex.

In one embodiment of the composition according to the invention, the MOPAC simulations comprise the additional step:
  selecting the complex having the lowest energy of formation and calculating from its structure the dipole moment.

The objects of the present invention are also solved by a composition comprising a liquid crystal material and an additive, in particular according to embodiments listed above, wherein said additive is present in an amount of 0.01-0.15 wt. %, preferably 0.05-0.12 wt. %, more preferably 0.08-0.11 wt. % and most preferably around 0.1 wt. % of the total composition.

In one embodiment, said additive, when viewed on its own, has no permanent dipole or a dipole $\leq 1$ Debye, preferably $\leq 0.1$ Debye.

Preferably, said additive gains a dipole in the presence of said liquid crystal material and, preferably, upon complex formation with said liquid crystal material, wherein, more preferably, said additive is L20 (2,4-dichloro-3,6-diethoxybenzoquinone).

In another embodiment, said additive has a permanent dipole, preferably a dipole $\geq 1$ Debye, more preferably $\geq 0.1$ Debye, wherein, preferably, said complex formed by said liquid crystal material and said additive has a dipole which is greater than the sum of the individual dipoles of said liquid crystal material and said additive on their own.

Preferably, said additive is selected from the group comprising MORPIP(2-{4-[(2,6-dimethylmorpholin-4-yl)(4-methylpiperidin-1-yl)methylene]cyclohexa-2,5-dien-1-ylidene}malononitrile), J6, and 10-γP3CNQ.

In one embodiment, said additive is a dye.
Preferably, said liquid crystal material is selected from the group comprising MLC-2038, ZLI-1695, E7 and ZLI-4792.

In one embodiment, said additive is soluble in said liquid crystal material.

In one embodiment, said liquid crystal material has a permanent dipole.

In another embodiment, said liquid crystal material has an induced dipole.

In one embodiment, said composition has an order parameter of at least 0.5, preferably of at least 0.7, wherein the order parameter S is defined as:

$$S = \frac{A_\| - A_\perp}{A_\| - A_\perp},$$

wherein $A_∥$ and $A_⊥$ are the measured absorbance values when the director axis of a liquid crystal or liquid crystal mixture is parallel ($A_∥$) or perpendicular ($A_⊥$) to the propagation axis of an incident polarized light, wherein, more preferably, a parallel state can be achieved by: in the case of a liquid crystal (LC) with positive dielectric anisotropy—inserting a liquid crystal or liquid crystal mixture in a parallel (or antiparallel, or homogeneous) aligned sandwiched cell; and either wherein a perpendicular state can be achieved by either applying an electric or magnetic field to such parallel (or antiparallel, or homogeneous) aligned cell, or alternatively by inserting the liquid crystal or liquid crystal mixture in a homeotropic (or perpendicularly, or vertically) aligned cell;

in the case of a LC with negative dielectric anisotropy—inserting a liquid crystal or liquid crystal mixture in a homeotropic (or perpendicularly or vertically) aligned sandwiched cell; and either wherein a parallel state can be achieved by either applying an electric or magnetic field to such homeotropic aligned cell, or alternatively by inserting the liquid crystal or liquid crystal mixture in a parallel (or antiparallel, or homogeneous) aligned cell.

The objects of the present invention are also solved by the use of a composition according to the present invention in a liquid crystal cell for a liquid crystal display, wherein, preferably, said liquid crystal cell is a single pixel cell or a multiple pixel cell.

In one embodiment, said use is directed at improving the grey scale response time speeds of said liquid crystal cell and/or for shortening the rise and/or decay times of said liquid crystal cell.

The objects of the present invention are also solved by a liquid crystal cell comprising the composition according to the present invention.

Furthermore, the objects of the present invention are solved by the use of a liquid crystal cell according to the present invention in a liquid crystal display.

Moreover, the objects of the present invention are solved by a method of improving the response time and/or the dielectric anisotropy and/or the grey scale response speed of a liquid crystal, preferably in a liquid crystal cell, comprising the steps:

providing a liquid crystal,
adding an additive to said liquid crystal, wherein said additive is capable of forming a complex with said liquid crystal, wherein, preferably, said liquid crystal and said additive are as defined in the present invention.

As used herein, the term additive is meant to be understood as any substance that can be added to a composition. The term "dopant", as used herein, is a term generally understood by someone skilled in the art, who will construe this term to mean any additive that is added to a material/medium, whereby, through addition of such additive, the properties of the material/medium are changed. In the context of semiconductors, the term "dopant" usually means an element that is introduced into a semiconductor to establish either p-type (acceptors) or n-type (donors) conductivity. With respect to optical media, the term "dopant" usually means an additive which is added to an optical medium, and thereby some of the optical properties of the optical medium are changed. For example, in optical fibres dopants are used to control the refractive index profile and other refractive properties of the fibre. With liquid crystals, a dopant, when added to such liquid crystal medium, may change its optical, electronic or other properties.

The term "MOPAC simulations" is a term generally understood by someone skilled in the art. It refers to a computer software termed "Molecular Orbital Package", which is based on a semi-empirical all-valence electron approximation for the study of the chemical behaviour of molecules and ions. As an all-valence electron approximation, it describes the chemical behaviour of molecules with respect to their molecular orbital by only considering the valence electrons for the construction of the orbitals. The MOPAC software incorporates several of the all-valence electron methods including AM1 and PM3 (see below). The all-valence electron methods are orders of magnitude faster than ab-initio calculations.

The terms J6 and 10-γP3CNQ refer to additive materials commonly known to someone skilled in the art. The terms MLC-2038, ZLI-1695, E7 and ZLI-4792 are terms describing liquid crystal materials which are taken from the product catalogues from Merck and other companies that are producers of liquid crystal materials.

The invention surprisingly reduces the response times (i.e. rise time, decay time, and grey scale response times) of liquid crystals (LCs), improves the dielectric anisotropy of liquid crystals, with the alignment of liquid crystal (LC) being unaffected.

Furthermore, another advantage of the present invention is that the dipole moment of the dopant is vastly improved through the proposed interaction of the additive, preferably the dopant and LC. This increases the number and classes of additives available for use.

The response time (turn on time [which can also be represented by the turn on speed factor] and turn off time) of liquid crystals is reduced (improved) by this invention. The magnitude of the dielectric anisotropy may be increased (improved) by this invention.

For example, in a typical embodiment of a liquid crystal display cell and polariser system, an electric field is applied to an aligned, birefringent liquid crystal. When the field is applied the liquid crystal aligns to some degree with the field and the birefringence and/or twist changes, thus the optical transmission of the system changes. However, the alignment requires some time and this invention significantly, and simply, reduces this time. Moreover, when the field is removed or changed the liquid crystal aligns to some degree to its original position or to the new field and the birefringence and/or twist changes. This invention also reduces this response time. This is an unusual effect and very useful.

Furthermore, this invention may also improve a fundamental property of the liquid crystal, namely the dielectric anisotropy. Increasing the magnitude of the dielectric anisotropy improves the response of the liquid crystal to applied fields.

Without wishing to be bound by any theory, the inventors think that the unifying feature of the present invention is that the LC and additive form a complex, preferably or especially when the additive is present in only small amounts. This has the effect that additives can be used which have a low to non-existent dipole. The present inventors have demonstrated that and how such complex formation takes place.

The invention describes a material comprising of additives, in particular dopants within a mixture of mesogens. The inventors found that small concentrations (such as, but not limited to, 0.1 wt %) of dopants that are capable of forming a complex with the mesogens (such as, but not limited to, J6 [aka MJ6B] or L20) improves the response time of liquid crystals (such as, but not limited to MLC-2038, ZLI-1695, E7, or ZLI-4792) by 10% to 33%. Furthermore, importantly as well as improving the turn on time also the decay time may also be improved by 12% to 25%.

As will become apparent further below, a further advantage of this invention is that the dopants may also improve the dielectric anisotropy of the liquid crystal, by 6% to 15%.

A further advantage of the present invention is the increase and improvement in the grey scale response speed of liquid crystal cells.

All these improvements occur without detrimental loss of liquid crystal alignment.

Reference is now made to the figures, wherein FIGS. 1 and 2 describes the dopants J6 and L20 respectively, FIG. 3 describes the schematic effect of dopants on positive and negative dielectric anisotropy LCs in antiparallel, twisted nematic and vertically aligned cells, FIG. 4 shows the effect of dopants on rise and decay time of positive and negative dielectric anisotropy LCs in 5 μm antiparallel, twisted nematic and vertically aligned cells. Positive percentages indicate an improvement, e.g. 10 ms to 7.5 ms, which means a +25% improvement.

Figure 9A:
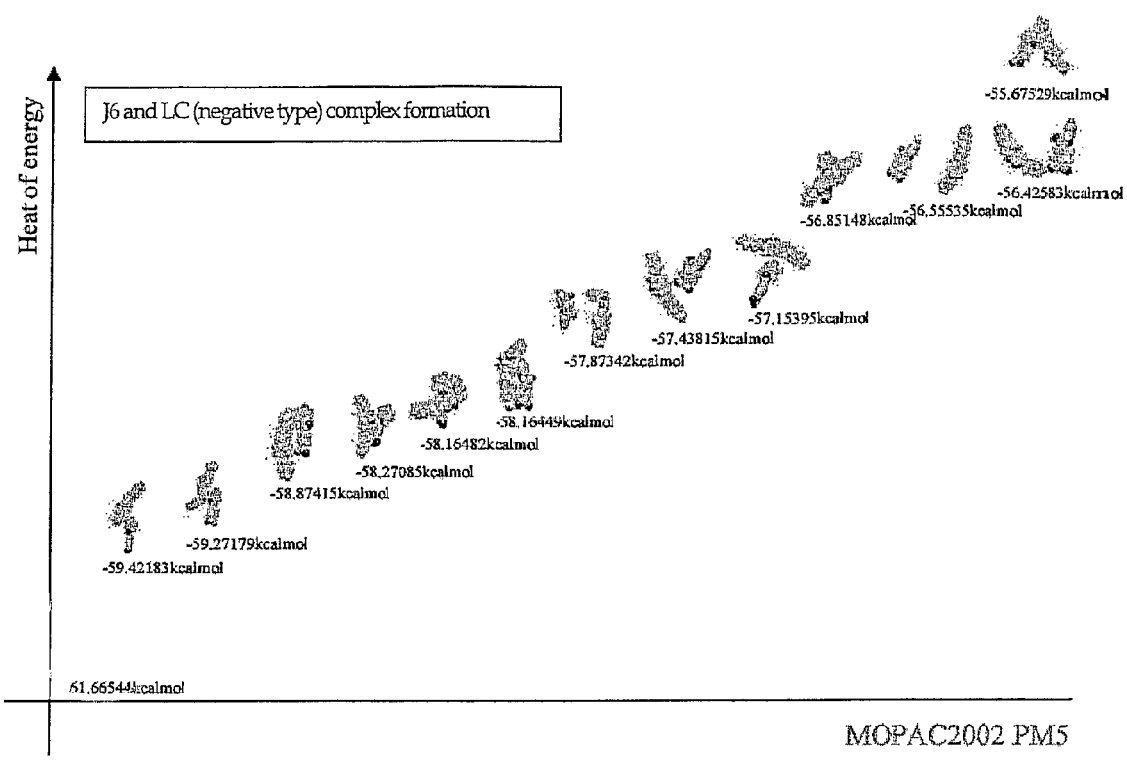
Figure 9B:
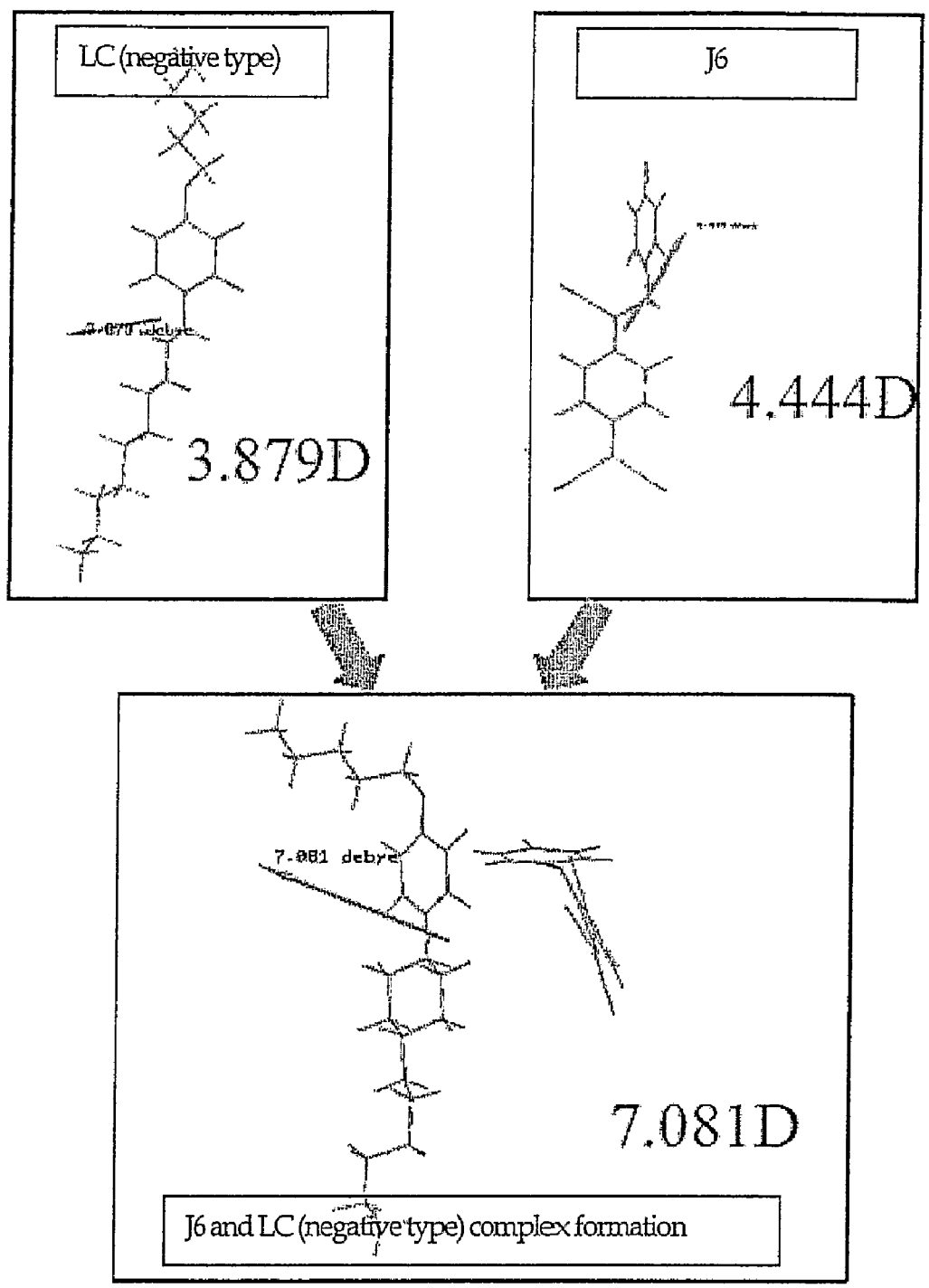
Figure 9C:
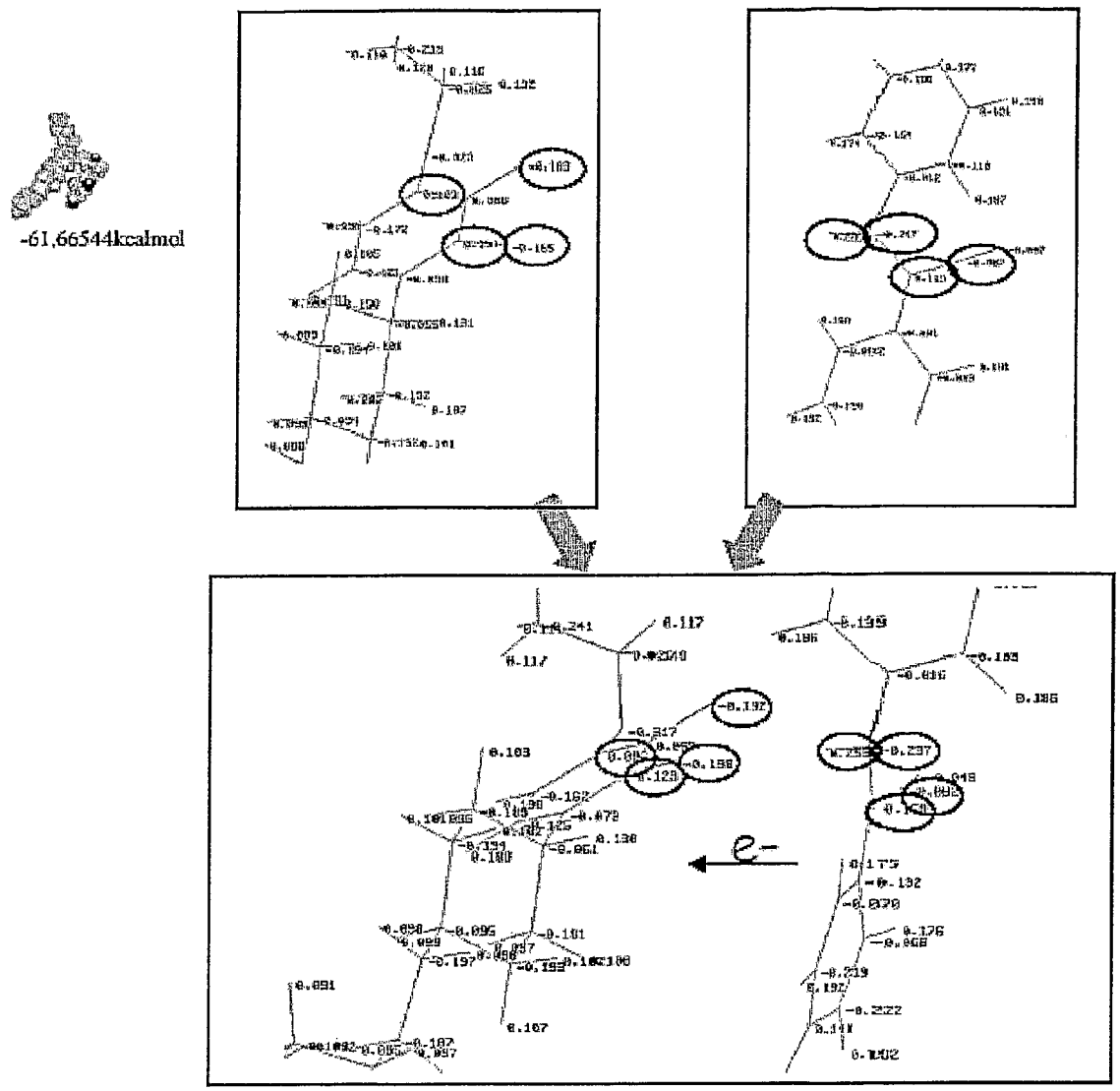

FIGS. 9A-C show the simulation of interaction of dipolar dopants (shown in this example is J6) with negative anisotropy LCs. The dopant and LC interact to form a complex with a greater magnitude dipolar moment than the parts. The direction of the dipole in the complex is suitable and follows closely the design of the original LC.

FIGS. 10A-C show the simulation of interaction of low-dipolar dopants (shown in this example is L20) with negative anisotropy LCs. The low dipolar dopant undergoes a conformational change when in the presence of a dielectric host medium (such as LCs). The dopant and LC interact to form a complex with a greater magnitude dipolar moment than the parts. The direction of the dipole in the complex is suitable for the design of the original LC.

Furthermore, reference is now made to the following examples, which are given to illustrate, not to limit the invention.

EXAMPLES

Sample Preparation MLC-2038, and 0.1% wt mixtures mixed (with a magnetic stirrer) for 10 hours overnight at 80° C. on a hotplate. The mixtures were centrifuged at 5,000 rpm for 7 minutes. Then 5 μm or 10 μm test cells from EHC with polyimide alignment layers (to enable vertical-aligned "VA", antiparallel "AP", or twisted-nematic "TN" alignment) were filled with mixtures by capillary action on a hotplate at 80° C. The filled cells were then annealed on a hotplate at 80° C. for 10 hours, and then allowed to cool gradually.

Sample Measurement

The response profile was measured by placing the cell on an optical microscope with crossed polarisers, then applying 250 Hz square-wave AC drive (zero DC offset) and measuring the transmission using a photodiode. For VA cells the response times to be compared for the improvement are those for the voltages corresponding to the range of 10% to 90% transmission of the first 100% transmission ($1^{st}$ Half wave plate voltage, HWP). This gives field strengths of ~0.3 Vpp/μm (0.15 $V_{pg}$/μm) to ~0.4 Vpp/μm (0.2 $V_{pg}$/μm). (Vpp is peak to peak voltage, Vpg is peak to ground voltage)

To determine the "speed factor" the response time was normalized to the thickness of the cell & applied field, and thus a normalized speed factor calculated.

When the LC is doped, the field strength for $V_{90}$ varies by ±0.01 Vpp/μm for all dopants. As an example, for pure MLC-2038 in 5 μm EHC homeotropic cells the $1^{st}$ HWP voltage is 5.3 Vpp.

Examples of Materials Used & Chemical Structures of J6, and L20

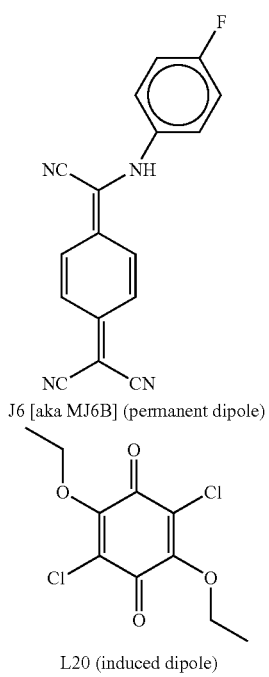

J6 [aka MJ6B] (permanent dipole)

L20 (induced dipole)

Liquid crystals: MLC-2038, negative dielectric anisotropy, from Merck, with $n_e$=1.5848 & $n_o$=1.4816, and the expected refractive index at its random alignment is $n_{random}$=1.516.

E7/BL001, positive dielectric anisotropy LC, from Merck.

Test cells: EHC Co. Ltd. 0.7 mm soda-lime glass, ITO 200-300 Å 100 Ωcm$^{-2}$, alignment via a surface-active agent (cetyl trimethyl ammonium bromide for VA) or rubbed polyimide for TN alignment, which is a single pixel cell.

SXRD—Sony's SXRD cells with a polyimide alignment layer promoting a VA structure, which is a multi-pixel cell.

Results

The pure MLC-2038 exhibits slow initial response to an applied voltage. In most cases adding dopants reduces this slow initial response. However, this is likely to be due to the impurities or crystals interfering with the homeotropic alignment. This defect induced alignment perturbation is unwanted and must be carefully distinguished from the response improvement of the dipolar dye.

Figure 1:
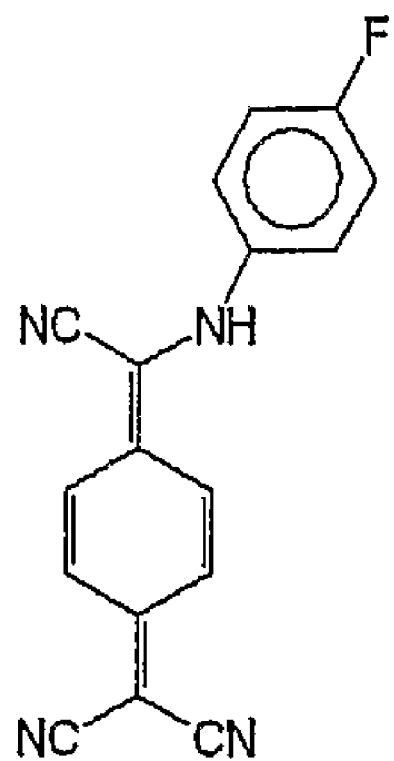
Figure 2:
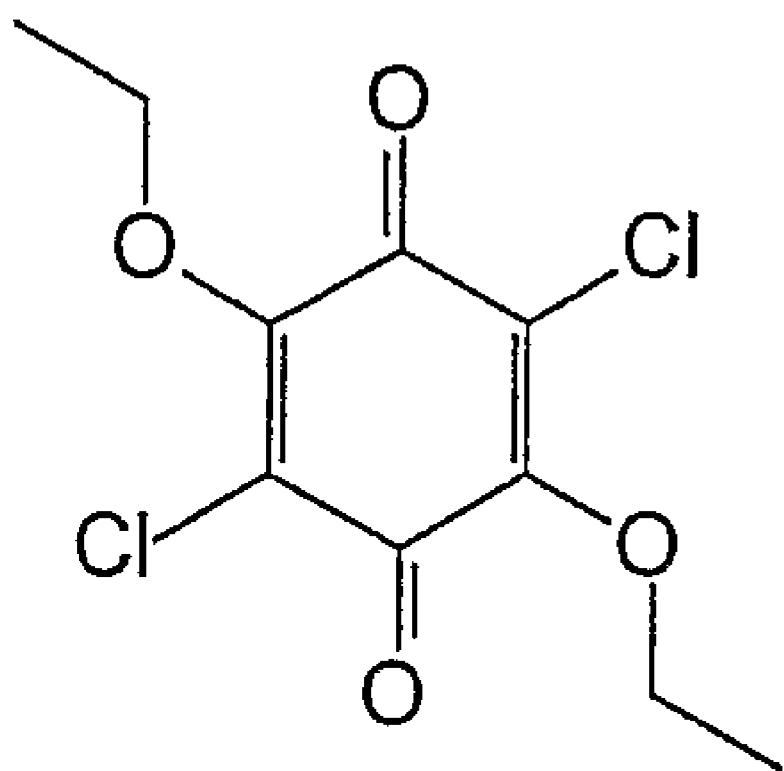
Figure 3:
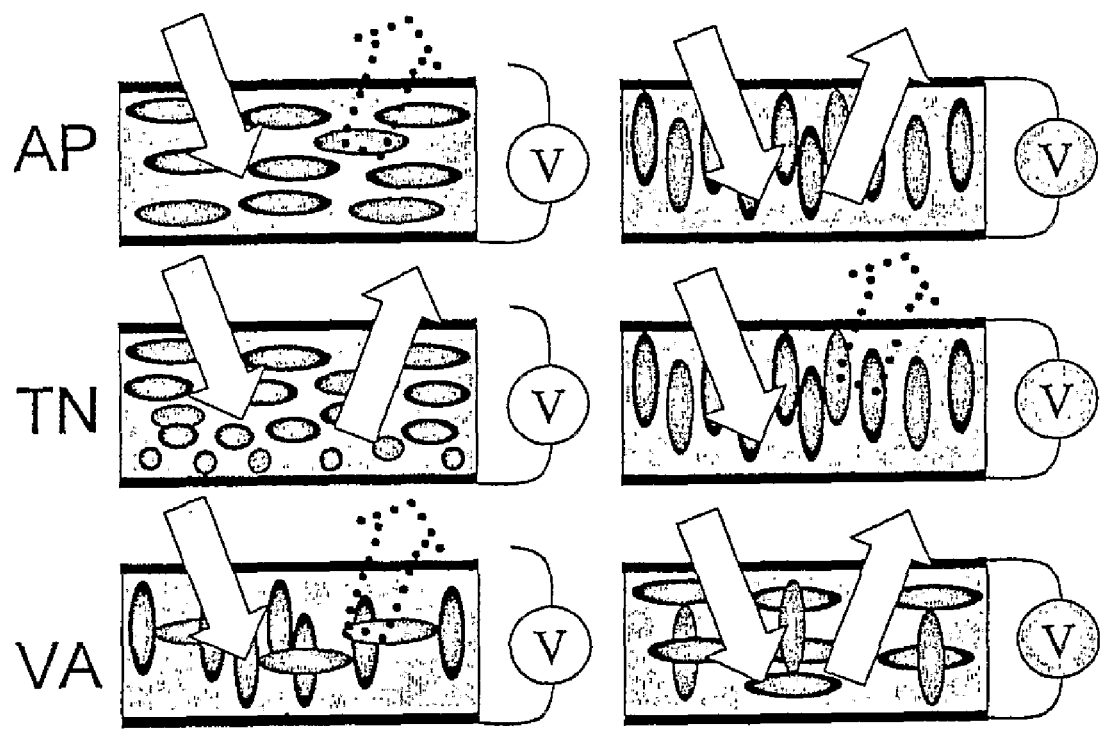
Figure 4:
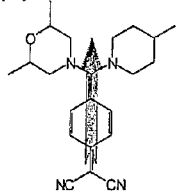
Figure 4:
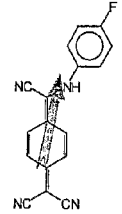
Figure 4:
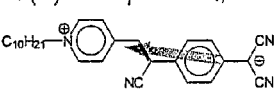
Figure 4:
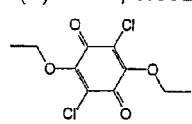
Figure 6:
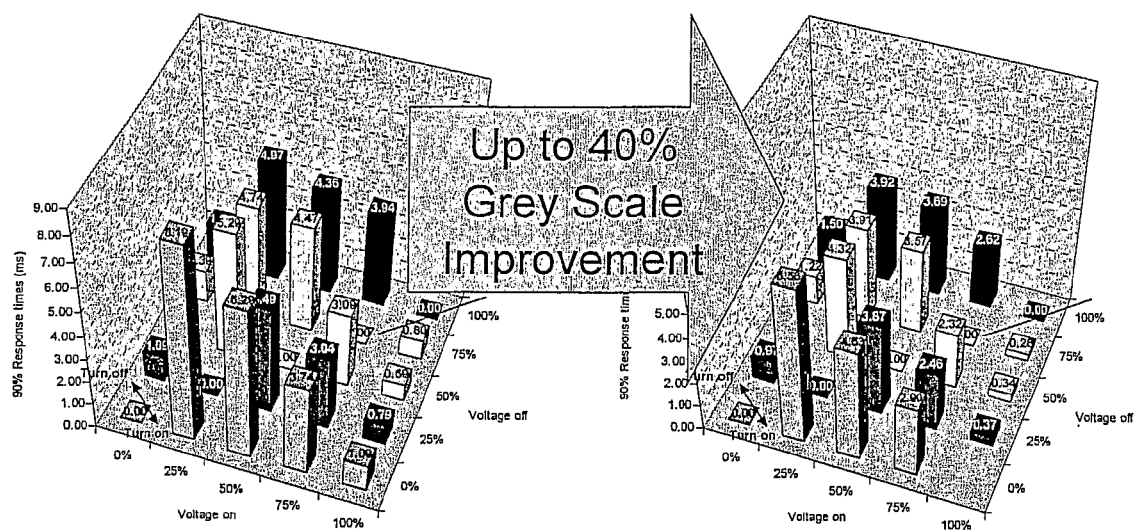
FIG. 6 shows the effect of 0.1 wt % J6 dopant on rise and decay times of MLC-2038 in SXRD-PI 2 μm homeotropic (VAN) cells.
Figure 7:
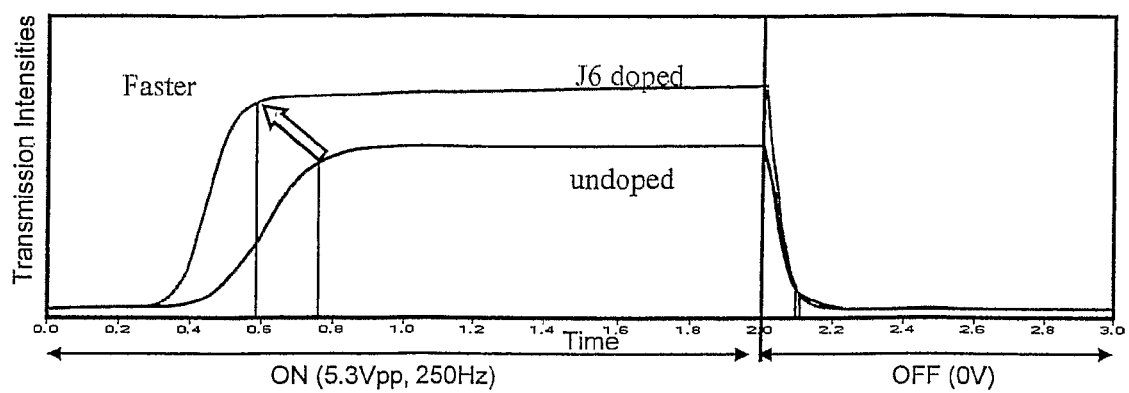
FIG. 7 shows the effect of J6 dopant on rise and decay times of MLC-2038 in EHC 5 μm homeotropic (VAN) cells.
Figure 8:
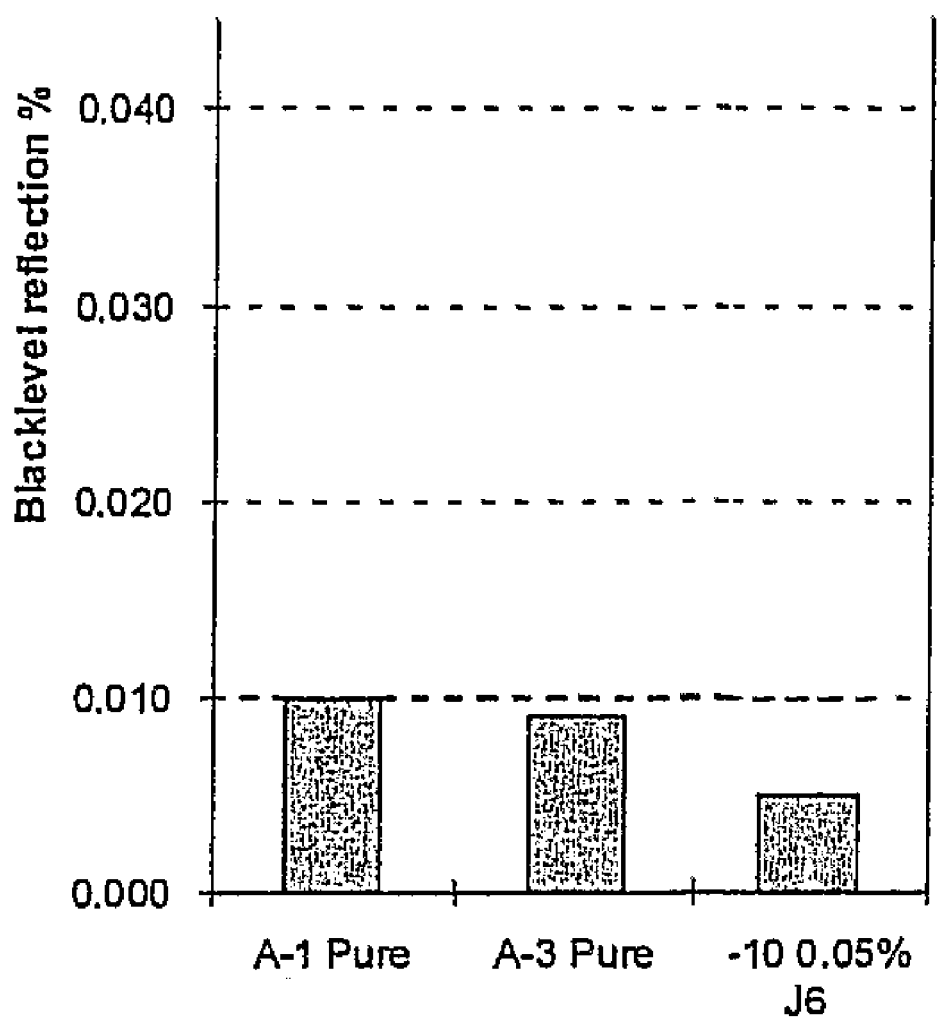
FIG. 8 shows the effect of J6 dopant on off-state optical transmission of MLC-2038 in SXRD-PI 2 μm homeotropic (VA) cells.

However, some dopants are soluble in MLC-2038, and do not seem to interfere with the off state homeotropic alignment. The best dopants in this study were L20 and J6. For J6 & L20 the reduction in rise time does not correspond to an increase in decay time (FIG. 4, FIG. 6 & FIG. 3), so this suggests that the anchoring/homeotropic alignment is unaffected or improved. Furthermore, the off state transmission has been found to be unchanged (or slightly lowered) by J6 (FIG. 8).

Figure 5:
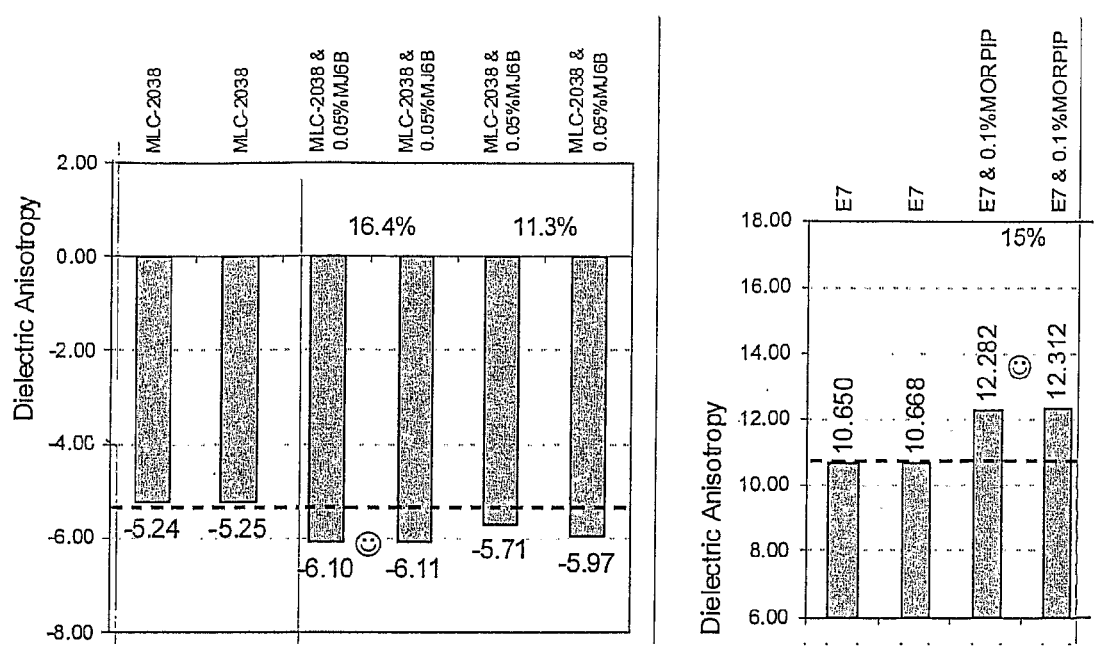
FIG. 5 shows the effect of dopants on dielectric anisotropy of both positive and negative dielectric anisotropy liquid crystals

Because the dopants form a complex with the LC, the rise times are improved. Indeed, the dielectric anisotropy is improved by the addition of the dopants (FIG. 5).

Some dopants have a dipolar moment, the dopants form a complex with the LC and this complex has an overall dipole moment, which is greater than the dipole of the parts FIG. 9 A-C.

Some dopants (e.g. L20) have no dipolar moment. However, when placed in an LC (or anisotropic solvent) the molecule of the dopant undergoes a conformation change, and the molecule becomes polar. Furthermore, the dopant interacts with the LC and forms a complex. and this complex has an overall dipole moment which is greater than the dipole of the parts, FIGS. 10 A-C.

MOPAC Simulations

To calculate the interaction between LC molecules and dopants the computer package MOPAC 2000 for Windows was used. An outline of the steps used in this simulation is noted below.

As outlined above, the term MOPAC refers to a software package which has incorporated several well-known semi-empirical molecular orbital methods, including AM1 and PM3. The terms AM1 and PM3 refer to different Hamiltonians, namely the Austin Model 1 and the parameterized model 3 Hamiltonian (for AM1 see also M. J. S. Dewar, et al., J. Am. Chem. Soc., 107, 3902 (1985); for PM3 see also J. J. P. Stewart, .J. Comput. Chem., 10, 209 (1989) and J. Comput. Chem., 10, 221 (1989)).

The following steps are shown in FIGS. 9A, 9B, 9C & 10)

The molecular structures were drawn directly into MOPAC 2000 for Windows.

Then the lowest energy of formation for each molecules individually was found, the both AM1 and PM3 Hamiltonians were compared, and the lowest energy molecular structure that was best fitted by both Hamiltonians was chosen to describe the optimal molecular structure, and thus the dipole moment of the individual molecules (upper part, FIG. 9B).

Then these optimised individual molecules were brought together (FIG. 9A), considering the charge of atoms & distribution of charge in the molecules (FIG. 9C), and the dipole moment of the molecules. Here 500 permutations of combinations were investigated by simulation, and the lowest energy of the combination chosen. This result showed if the formation of a complex was energetically favourable (FIG. 9A).

Figure 10:
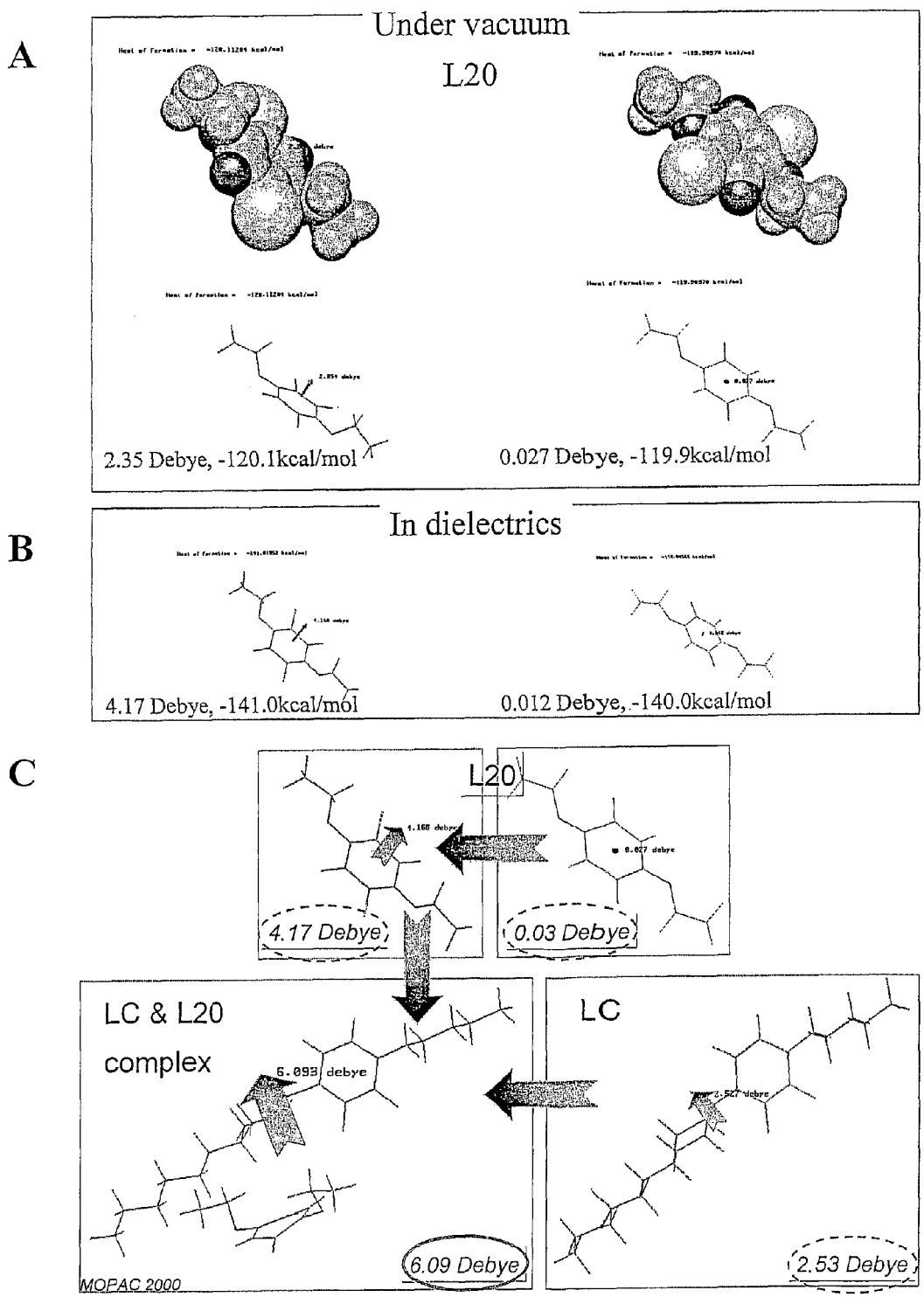

If a complex was deemed likely to form, then, in iterative repetition, the structure of individual molecules (of the complex) was optimized in order to find the lowest energy of formation for the complex as a whole (for example FIG. 10, and also the final lowest energy state of the complex in FIGS. 9A & 9B).

Finally, the complex with the lowest energy of formation was chosen as being the optimised molecular structure of the complex, and from this structure the dipole moment calculated (lower part, FIGS. 9B & 10).

The features of the present invention disclosed in the specification, the claims and/or in the accompanying drawings, may, both separately, and in any combination thereof, be material for realizing the invention in various forms thereof.

The Invention claimed is:

1. A composition comprising a liquid crystal material and an additive, wherein said additive is capable of forming a complex with said liquid crystal material, wherein said additive, when viewed on its own, has no permanent dipole or a dipole $\leq 0.1$ Debye, wherein said additive is present in an amount of 0.01-0.15 wt. % of the total composition, and wherein said additive gains a dipole in the presence of said liquid crystal material and upon complex formation with said liquid crystal material.

2. The composition according to claim 1, wherein said liquid crystal material and said additive form a complex.

3. The composition according to claim 2, wherein said liquid crystal material and said additive form a complex, as measured by a method selected from the group comprising FTIR, UV-visible absorption, fluorescence, in particular polarized fluorescence, dielectric anisotropy and scanning near-field optical microscopy.

4. The composition according to claim 1, wherein said liquid crystal material and said additive form a complex as simulated in MOPAC-simulations.

5. The composition according to claim 4, wherein said MOPAC-simulations comprise the following steps/conditions:

in a computer environment, providing a molecular structure of said liquid crystal material and a molecular structure of said additive, optimizing each molecular structure individually by determining the lowest energy of formation, determining the AM1 and PM3 Hamiltonians and selecting the lowest energy molecular structure that is best fitted by both Hamiltonians, bringing together the optimized individual molecules resulting from the previous step, allowing them to combine, taking into account the charges of atoms, the distribution of charges and the dipole moment of the molecular structures, permutating the previous combination step a number of times in the range of from 100-1000 times, thus allowing a complex, if any, of said liquid crystal material and additive molecules to form, in such complex of molecules, optimizing the structure of the individual molecules so as to determine the lowest energy of formation of the complex and the lowest energy state of the complex.

6. The composition according to claim 5, wherein said MOPAC simulations comprise the additional step:

selecting the complex having the lowest energy of formation and calculating from its structure the dipole moment.

7. The composition according to claim 1, wherein said additive is 20(2,4-dichloro-3,6-diethoxybenzoquinone).

8. The composition according to claim 1, wherein said additive is a dye.

9. The composition according to claim 1, wherein said liquid crystal material is selected from the group comprising MLC-2038, ZLI-1695, E7 and ZLI-4792.

10. The composition according to claim 1, wherein said additive is soluble in said liquid crystal material.

11. The composition according to claim 1, wherein said liquid crystal material has a permanent dipole.

12. The composition according to claim 1, wherein said liquid crystal material has an induced dipole.

13. The composition according to claim 1, wherein said composition has an order parameter of at least 0.5, wherein the order parameter S is defined as:

$$S = \frac{A_\| - A_\perp}{A_\| + A_\perp},$$

wherein $A_\|$ and $A_\perp$ are the measured absorbance values when the director axis of a liquid crystal or liquid crystal mixture is parallel ($A_\|$) or perpendicular ($A_\perp$) to the propagation axis of an incident polarized light, wherein, a parallel state can be achieved by:

in the case of a liquid crystal (LC) with positive dielectric anisotropy—inserting a liquid crystal or liquid crystal mixture in a parallel (or antiparallel, or homogeneous) aligned sandwiched cell; and either wherein a perpendicular state can be achieved by either applying an electric or magnetic field to such parallel (or antiparallel, or homogeneous) aligned cell, or alternatively by inserting the liquid crystal or liquid crystal mixture in a homeotropic (or perpendicularly, or vertically) aligned cell;

in the case of a LC with negative dielectric anisotropy—inserting a liquid crystal or liquid crystal mixture in a homeotropic (or perpendicularly or vertically) aligned sandwiched cell; and either wherein a parallel state can be achieved by either applying an electric or magnetic field to such homeotropic aligned cell, or alternatively by inserting the liquid crystal or liquid crystal mixture in a parallel (or antiparallel, or homogeneous) aligned cell.

14. The composition according to claim 1, wherein said additive is a dopant.

15. A liquid crystal cell for a liquid crystal display comprising a composition according to claim 1.

16. The liquid crystal cell according to claim 15, wherein said liquid crystal cell is a single pixel cell or a multiple pixel cell.

17. The liquid crystal cell according to claim 15, wherein the composition is for improving the grey scale response time speeds of said liquid crystal cell and/or for shortening the rise and/or decay times of said liquid crystal cell.

18. The liquid crystal cell A liquid crystal cell comprising the composition according to claim 1.

19. The liquid crystal cell according to claim 18 in a liquid crystal display.

20. A method of improving the response time and/or the dielectric anisotropy and/or the grey scale response speed of a liquid crystal in a liquid crystal cell, comprising the steps:
providing a liquid crystal,
adding an additive to said liquid crystal, wherein said additive is capable of forming a complex with said liquid crystal, wherein said liquid crystal and said additive are as defined in claim 1.

* * * * *